United States Patent [19]
Rafson

[11] Patent Number: 5,017,351
[45] Date of Patent: * May 21, 1991

[54] PROCESS FOR REMOVING VOLATILE ORGANIC COMPOUNDS FROM AIR STREAMS

[76] Inventor: Harold J. Rafson, 1852 Dale Ave., Highland Park, Ill. 60035

[*] Notice: The portion of the term of this patent subsequent to Sep. 5, 2006 has been disclaimed.

[21] Appl. No.: 383,357

Related U.S. Application Data

[63] Continuation-in-part of Ser. No. 154,879, Feb. 11, 1988, Pat. No. 4,863,495.

[22] Filed: Jul. 21, 1989

[51] Int. Cl.$^5$ ............................................. B01J 8/00
[52] U.S. Cl. ................................. 423/245.2; 55/85; 55/89; 423/DIG. 20; 422/37; 422/28
[58] Field of Search ............ 55/85, 90, 89, 209, 55/257.7, 259; 62/91, 121; 423/DIG. 20, 245.2; 422/37, 28

[56] References Cited

U.S. PATENT DOCUMENTS

| | | | |
|---|---|---|---|
| 1,979,189 | 10/1934 | Bowers | 55/89 |
| 2,858,903 | 11/1958 | Goetz et al. | 55/89 |
| 3,132,012 | 5/1964 | Walker | 62/91 |
| 3,406,498 | 10/1968 | Wisting | 55/257 C |
| 3,593,496 | 7/1971 | Merrill | 55/77 |
| 3,618,301 | 11/1971 | Handyman | 55/89 |
| 3,756,171 | 9/1973 | De Bord | 55/233 |
| 4,125,589 | 11/1978 | deVries | 423/245 |
| 4,238,461 | 12/1980 | deVries | 423/210 |
| 4,284,609 | 8/1981 | deVries | 423/242 |
| 4,353,715 | 10/1982 | Mir et al. | 55/85 |
| 4,364,750 | 12/1982 | Koncz | 55/89 |
| 4,410,339 | 10/1983 | Bachhofer et al. | 55/85 |
| 4,416,861 | 11/1983 | deVries | 55/94 |
| 4,844,721 | 7/1989 | Cox et al. | 55/85 |
| 4,863,495 | 9/1989 | Rafson | 55/85 |

FOREIGN PATENT DOCUMENTS

| | | | |
|---|---|---|---|
| 17183 | 2/1976 | Japan | 55/90 |
| 41677 | 4/1976 | Japan | 55/84 |
| 136770 | 11/1978 | Japan | 55/68 |
| WO86/02283 | 4/1986 | PCT Int'l Appl. | 55/68 |
| 1222583 | 2/1971 | United Kingdom | 55/84 |

OTHER PUBLICATIONS

Card, Thomas, "Volatile Organic Compound Removal in Packed Towers and Atomized Mist Odor Scrubbing Systems", 62nd Conf.; WPCF, Oct. 1989.
Glotfelty et al, Pesticides in Fog Nature vol. 325 pp. 602–605 Feb. 12, 1987.

*Primary Examiner*—Bernard Nozick
*Attorney, Agent, or Firm*—Roland H. Shubert

[57] ABSTRACT

Volatile organic compounds including hydrocarbons, halogenated compounds and other hazardous and toxic chemicals are removed from air streams by contacting the air with a suspension of tiny aqueous droplets sized such that the droplets have an internal pressure significantly greater than atmospheric. The capacity of aqueous droplets to hold organic compounds and the rate of transfer of organic compounds from an air stream to the droplets increase rapidly as the droplet size decreases and the droplet internal pressure rises. After substantial transfer of volatile organic compounds from the air into the droplets is accomplished, the droplets are caused to grow and to coalesce and are separated from the air stream. The resulting liquid effluent is disposed of in a manner which prevents escape of contained contaminant compounds.

23 Claims, 2 Drawing Sheets

FIG. 1

FIG. 2

PROCESS FOR REMOVING VOLATILE ORGANIC COMPOUNDS FROM AIR STREAMS

CROSS-REFERENCE TO RELATED APPLICATIONS:

This application is a continuation-in-part of U.S. patent application Ser. No. 07/154,879 which was filed on Feb. 11, 1988 now U.S. Pat. No. 5,017,351.

BACKGROUND OF THE INVENTION

1. Field of the Invention

This invention relates generally to a process for removing contaminants from a gas stream.

More particularly, this invention relates to the removal of volatile organic compounds from air streams.

The build-up of volatile organic compounds in ambient air is of increasing concern as such compounds are now recognized as a major source of air pollution in many urban areas. Many volatile organic compounds are released into the air through the inevitable discharges accompanying industrial processes and chemical manufacture and the effects of such air pollution have had much attention.

It has also become evident that the treatment of municipal liquid wastes releases substantial quantities of volatile organic compounds into the atmosphere. Some of these compounds find their way into collection systems as oils and other wastes which are dumped into sewers and some by run-off from rain washing streets with residues from automotive traffic. The "sanitary" waste water treatment system treats biological wastes and does not deal with many of the hazardous and often toxic volatile organic compounds in municipal sewage. Some of the volatile organic compounds are absorbed by the sludge produced in treatment plants but, when the sludge is composted or dried, the compounds are again released. No satisfactory means for control of these pollutants is presently available.

Municipal waste water treatment facilities liberate volatile organic compounds in a number of different treatment operations. Such operations include, for example, pumping stations, trickling filters, aerobic digesters, aeration basins composting, sludge drying, and the like. The variety and quantity of volatile organic compounds liberated into the atmosphere in such unit operations include many compounds that one would not ordinarily expect to be found in sewage sources. Major classes of organic compounds identified in studies of process air streams in certain municipal waste water treatment plants include hydrocarbons of all sorts; aromatics including benzene, alkyl benzenes, toluene, xylenes, naphthalene and the like; oxygenated compounds such as alcohols, ketones and epoxides; halogenated compounds including chloroform, trichloroethylene, methylene chloride and freons; nitrogenous compounds such as pyridine and various nitriles; and sulfur containing compounds including dimethyl disulfide and mercaptans. The concentration of individual compounds typically ranges, in gaseous emissions, from a few parts per billion to a few hundred parts per million. Because of these low contaminant concentrations and because of the very large volume of air involved, ordinary treatment methods such as direct combustion, adsorption, and the like, are either not applicable or are prohibitively expensive. Conventional technologies using recirculating chemicals concentrate and revolatize pollutants which re-contaminates the exhaust gases.

Many industrial processes liberate enormous quantities of hazardous volatile organic chemicals. A recent survey indicates that in 1987, 237 billion pounds were emitted by industry into the air in this country. A wide variety of compounds were emitted with the major contaminants including toluene, trichloroethane, ammonia, ethylene, xylene, chlorine, methyl ethyl ketone, trichloroethylene, methanol, carbon disulfide and many others. Many commercial operations also liberate volatile organic compounds to the atmosphere. Examples of such polluting operations include auto paint spray shops, dry cleaning establishments, food service facilities, print shops, furniture refinishing operations, and the like.

Attention is also being focused on the air within enclosures including the interiors of processing and manufacturing plants and office buildings. Office buildings, in particular, often display levels of pollutants many times higher than that of the outside air. Recent trends in office building construction include sealed windows and a high level of air recirculation with little exchange of interior and exterior air, in order to maximize energy savings and to gain better control of temperature and air circulation. At the same time, the amount of gaseous pollutants released into the building air has tended to sharply increase. Typical sources of volatile organic compounds released into the atmosphere within a building include emissions from carpets, carpet backings, furniture fabrics and padding, and foamed plastic packing materials as well as solvent emissions from operating and cleaning office equipment and food service operations. In addition to gaseous contaminants, the atmosphere within many buildings contains finely divided solid contaminants including smoke, pollen and air borne bacteria and viruses. In some instances, the combined load of gaseous and particulate contaminants within a building have become so high as to cause allergic reactions and respiratory distress among a large proportion of the building's tenants. The usual treatment or conditioning of recirculating air within buildings and other enclosures is limited to the adjustment of temperature and humidity and particulate removal, usually by filtering. Such conditioning treatments are ineffective for removing gaseous contaminants and often are inadequate to remove fine particle contaminants.

2. Description of the Prior Art

One treatment method proposed in the patent literature for the removal of organic pollutants from air is the set out in the Merrill patent, U.S. Pat. No. 3,593,496. Merrill discloses that organic pollutants such as hydrocarbons can be removed from air by mixing the air with an aerosol of water droplets containing a surfactant which presents an oleophilic surface on the water droplets. The aerosol droplets absorb organic pollutants into and on their oleophilic surfaces and removal of the droplets from the air stream leaves a substantially purified air stream. Merrill prefers to form his droplets from aqueous suspensions of lecithin compounds as the surfactant.

Another process, which has come to be know as mist scrubbing, has recently been developed for removing contaminants, notably odorous contaminants, from gas streams. This process uses an aqueous solution of one or more chemicals which are reactive toward or able to solubilize the odorous contaminants. Contact between the reagent solution and the gas is accomplished by atomizing the aqueous chemical solution into very tiny liquid droplets and dispersing the droplets into the gas stream. The liquid droplets are small enough such that they do not immediately settle out but instead flow with the gas much in the manner of a natural fog. Typical installations utilize droplets having a number median diameter on the order of about ten microns. Mist scrubbing processes are illustrated by U.S. Pat. Nos. 4,125,589 and 4,238,461, both to deVries.

In typical mist scrubbing processes, a suspension of atomized reagent droplets in an air stream is passed in concurrent fashion through a gas-liquid contacting chamber or scrubber vessel. It is usual practice to introduce the reagent droplet suspension into the top of the scrubber vessel and to remove a cleaned gas stream from the bottom of the vessel. The reaction vessel contains no packing or internal media of any kind and is sized to provide the desired reaction time, typically ranging from about three to sixty seconds, between the gas and droplets.

Drain means are ordinarily provided at the bottom of the vessel to remove that spray liquid which settles out in the contacting step and the collected liquid is discharged as a waste stream. Additional points of liquid collection are also provided following the contacting chamber at fans, elbows, stack bottoms and the like. Depending upon reaction conditions, particularly contact time and the size distribution of the spray droplets, the amount of spray liquid which settles out, and is removed from, the vessel is normally less than the amount of liquid introduced into the scrubber vessel in the droplet spray. The remainder of the spray liquid is carried from the reaction chamber with the exiting cleaned gas stream either as a vapor or as a suspension of tiny droplets or is volatilized to saturate the gas stream. A nearly complete reaction between the reagent and the gas contaminants can routinely be achieved. Because of the low liquid flow rate and that the reagents ordinarily used in odor removal are reacted and reduced to low concentrations and comprise chemicals such as sodium hypochlorite, sodium hydroxide and sulfuric acid, the escape of some exhausted reagent droplets in the cleaned air stream is of no significant concern.

However, with the recognition of the presence of hazardous, toxic, and not innocuous components in the gas stream, it became necessary to observe the fate of those compounds as treated by mist scrubbing. It soon became clear that significant uptake of compounds into the liquid droplets was being accomplished even for compounds which were not expected to be significantly soluble or reactable.

A study totally unrelated to gas scrubbing technology and concerning the concentrations of pesticides found in morning mists above agricultural fields suggests that process mechanism analogous to those employed by Merrill and deVries may also occur in the natural environment. Researchers D. E. Glotfelty et al, writing in *Nature*, Volume 325, Pages 602–605, Feb. 12, 1987, reported that certain natural fogs contained unexpectedly high concentrations of pesticides, herbicides and other chemicals. Fog sampled in Beltsville, MD and in the San Joaquin Valley of California was found to contain concentrations of some toxic substances that was many times higher than was predicted by calculations using Henry's Law. Concentrations of insecticides such as malathion and herbicides such as alachlor in the fog droplets was far higher than was the level of these compounds in the surrounding air.

Their reported data showed that enrichment into the fog droplets was more pronounced for hydrophobic pesticides than for hydrophilic ones. The authors proposed two hypotheses to explain the enrichment. One hypothesis was that the fog droplets contained solutes such as dissolved or colloidal organic material which increased the solubility of hydrophobic compounds thereby shifting the equilibrium to the solution phase. A second hypothesis was based upon the authors' observation that surface-active, non-pesticidal organic matter was present in the fog liquid as shown by its foamy, soapy appearance. Although the authors cautioned that they had no experimental verification, they considered it to be a reasonable conjecture that surface-active material might have been present in sufficient amounts to produce an organic film on the surface of the fog droplets. Thus, the surface-active organic matter presumed to be present at the air-water interface acted to enhance the uptake of pesticides into the aqueous phase in a manner reminiscent of the process described by Merrill.

SUMMARY OF THE INVENTION

It has been found that the up-take and removal of volatile organic compounds from air streams by aqueous droplets is a function of internal droplet pressure. The higher the internal droplet pressure, the greater is the capacity of the droplet to solubilize and contain most organic compounds. Internal droplet pressure, in turn, is a function of droplet size and the smaller the droplet the higher is the internal pressure. In practice of the invention, a contaminated air stream is contacted with a suspension of aqueous droplets for a period of time sufficient to allow substantial transfer of organic molecules from the air into the droplets. Tiny particulate solids such as smoke and pollen also tend to be captured by the droplets. Droplets are then separated from the air and the collected liquid is treated to remove and capture the organic contaminants or is otherwise disposed of in a manner which prevents escape of organic compounds contained therein.

Hence, it is an object of this invention to remove volatile organic compounds from air and other gas streams.

It is a specific object of this invention to treat process air streams to remove organic compounds therefrom.

One specific object of this invention is to treat air streams derived from the processing of municipal waste waters to remove volatile organic compounds, some of which may be odorous, therefrom.

Another specific object of this invention is to remove volatile organic compounds from the gaseous emissions of industrial and commercial processes.

Another specific object of this invention is to remove contaminants from the air circulating within a building or other enclosure.

DESCRIPTION OF THE DRAWING

Specific embodiments of the invention are illustrated in the drawing in which:

FIG. 1 shows a schematic diagram of a system for the removal of volatile organic compounds from gas streams according to the present invention; and FIG. 2 illustrates an embodiment of the invention specially adapted for cleaning and recirculating air within an enclosed space.

DETAILED DESCRIPTION OF THE INVENTION

This invention arises from observations that the capacity of aqueous droplets for the capture and holding of organic compounds commonly found in process air streams increases rapidly as the internal droplet pressure increases. Application of those observations in the manner hereinafter set forth results in a practical gas-cleaning process. Following is a description of the process steps required to carry out the process and an explanation of the mechanism of organic compound concentration in aqueous droplets. The process in a broad sense can be considered to include three distinct steps. First, the gas stream being treated is contacted with aqueous droplets having an internal pressure significantly greater than atmospheric for a long enough time to allow transfer of volatile organic compounds from the gas to the droplets. Next the droplets, which now carry organic compounds, are coalesced and removed from the gas stream. Lastly, the liquid effluent obtained by droplet coalescence is treated in a manner which removes and contains the contaminants or is disposed of in a fashion which removes or destroys or immobilizes the contaminant compounds.

All three of these steps must be carefully integrated to obtain efficient operation of the process. The transfer efficiency of volatile organic compounds from the gas to the aqueous droplets and the capacity per unit volume of liquid of those droplets for organic compounds both increase as the median diameter of the droplet population decreases. As has been noted before, the internal pressure of aqueous droplets increases as the droplet diameter decreases. Putting the droplet internal pressure requirements in terms of droplet diameter, a droplet population in which the number median diameter is less than about ten microns is appropriate for use in the process.

After the aqueous droplets have been in contact with a contaminated gas stream for a sufficient length of time, ordinarily at least about three seconds, to obtain substantial transfer of volatile organic compounds from the gas to the droplets, it is necessary to separate the droplets from the gas. Efficient separation of the droplets from the gas ordinarily requires that the individual droplets are caused to grow and coalesce. Settling alone is not a satisfactory separation method as a water droplet having a diameter of ten microns, for example, reaches a terminal settling velocity of about 3 mm per second in air. Air moving at a velocity above the terminal settling velocity of the water droplets will carry the droplets with the air stream and many will be transported out of a contacting chamber.

Droplet growth and coalescence may be promoted in a number of ways. First, providing additional contact time over that required for transfer of organic compounds to the droplets will result in some degree of growth through droplet collision. Obstructions of various types may be placed in the gas stream so that entrained droplets impinge upon the surface of the obstruction for collection. In this regard, demisters constructed of fabric mesh are particularly effective. Ultrasonic vibrations such as initiated by ultrasonic whistles also encourage droplet vibration and collisions. Small droplets may also be agglomerated in a shower of larger droplets. In another approach to droplet growth, coalescence and removal, the gas may be passed over chilled heat exchanger surfaces whereby the gas is cooled causing droplet growth by condensation of water vapor. In that embodiment, thermal forces also cause migration of the droplets to the cold surface where the droplets coalesce. In most instances, a combination of these various means for promoting droplet growth are effectively utilized.

It is necessary to balance those factors in order to achieve optimum process efficiency. Decreasing the median droplet size of the aqueous droplets favors the transfer of volatile organic compounds from the gas to the droplets. Also, because the smaller the droplet the greater is the internal pressure, the capacity per unit volume of the liquid droplets for organic compounds increases as droplet size decreases. On the other hand, the smaller are the liquid droplets, the more difficult it is to remove the droplets from the gas. Hence, the smaller the droplets used the more efficient must be the droplet coalescence and removal steps in order to obtain optimum performance.

The liquid effluent obtained by separation of the aqueous droplets from the gas stream must be further treated in order to remove, destroy or immobilize the organic contaminants contained therein. Because the amount of liquid effluent produced by the process is relatively small, typically on the order of about 5–100 milliliters of liquid per cubic meter of gas treated, it is quite feasible to destroy the organic contaminants by incineration of the total effluent fraction. Incineration may be accomplished using conventional, supplementally heated devices or the liquid may be added to a fuel for burning.

The liquid effluent may also be treated in any manner which removes the organic contaminants, many of which may be hazardous or toxic, from the effluent leaving a cleaned water stream suitable for disposal in sewers. One appropriate method for effluent treatment is by adsorption using a variety of industrial adsorbents either singly or in combination. Suitable adsorbents include activated carbon, silica gel, fuller's earth, bauxite, activated alumina, chars, magnesia and ion exchangers. The adsorbents may be stripped of their contaminant load and reused, or they may be incinerated or treated in some other fashion which either immobilizes or destroys the contained contaminants. Other techniques which may find use for removing the organic contaminants from the water portion of the effluent include extraction of the organics by crystallization or freezing, by solvent extraction, by forth flotation or by distillation or by any other physical method which provides the desired separation. The organic contaminants, of course, make up only a small fraction of the total liquid effluent and so, after separation, the organic fraction is considerably reduced in volume compared to the water-containing liquid effluent. That small waste volume allows wide freedom in selecting an appropriate means for final disposal of the contaminants. Final disposal of the contaminants may, for example, be accomplished by immobilizing in a solid and by chemical reaction as well as by incineration or by placement in a hazardous land fill site.

In addition to stripping volatile organic and inorganic compounds from a gas stream, the tiny aqueous droplets used in this invention tend also to remove fine particulate solids from the gas. Solids removed in the process, if present in the gas being treated, include dusts, smoke particles, pollen, airborne bacteria, spores, and viruses. The presence of particulates in the gas being treated does not interfere with the gaseous organic contaminant removal and, because some small particles act as condensation nuclei, may even aid in the coalescence, growth and separation of aqueous droplets from the gas. If the particulate load carried by the gas being treated is high, then it often is advantageous to filter the liquid effluent to remove solids before proceeding with a separation of the organic contaminants from the water, especially when adsorption is used for the separation. Other liquid-solid separation techniques such as settling or centrifugation may be used instead of filtration with similar advantage.

Volatile organic compounds, which are often hazardous and toxic chemicals, are present in gaseous emissions (usually from industrial processes) in parts per billion or parts per million concentration levels. Contaminated air streams are also produced by air stripping liquids, such as contaminated ground water, which contain hazardous compounds. The process of this invention will remove those gaseous contaminants from such emissions and collect them in a relatively concentrated form so that safe disposal practices can be accomplished effectively and economically.

The concentration of normally non-soluble volatile organic compounds within aqueous droplets is achieved by creating at atmospheric pressure localized superatmospheric pressure conditions in which the volatile organic compounds are additionally soluble and additionally reactable. That apparent incongruity is achieved by forming extremely small droplets in which the surface tension of the liquid, which may be water or a dilute chemical solution, creates a higher pressure within the droplet than exists in the surrounding atmosphere. Each droplet may be visualized as a clenched fist; the smaller and more tightly clenched it is the greater the pressure inside. The internal pressure of a droplet of any particular diameter may be calculated from surface tension data. With water, a droplet of 10 microns diameter has a calculated internal pressure of about 4 psi. Each droplet, then, acts as a small pressure vessel in which volatile organic compounds have increased solubility. Further, higher pressures tend to increase the reactivity of compounds dissolved in the droplet. Any reaction which takes place between compounds present in the droplet tends to decrease the vapor pressure of those compounds and so decrease their tendency to escape from the droplet.

It can now be appreciated that the differential pressure between the interior of a small droplet and the atmosphere acts as a first disproportion to effect a preferential concentration of organic compounds within the droplet. A second aspect of the preferential concentration of contaminants achieved by this invention arises from a second disproportion between the inside and the outside of each droplet. This second disproportion is the mechanism and the difference in the ease of passage of a contaminant compound into or out from the droplet. These differences can be visualized as follows. The entering molecule need only be dissolved in the surface film of the droplet at atmospheric pressure. An exiting molecule has a greater hurdle to overcome in that it is more soluble on the inside of the droplet surface film than on the outside. Therefore, these natural forces will maintain it at higher concentrations on the inside. Moreover, the partial pressure exerted by the compound inside the droplet is decreased because of the higher droplet pressure thus further reducing the tendency of the compound to escape. It is also possible that surface tension forces of the liquid further act to hold the molecules of the contaminant compounds with the droplets.

All of these effects, taken in combination, serve to produce a remarkable level of transfer of diverse organic compounds from air streams and their concentration in micron size aqueous droplets. The degree of such removal can be appreciated from an examination of the following data. Tests were performed using a mist scrubber generating droplets of approximately 10 microns in diameter which corresponds to a calculated internal pressure of about 4 psi. The scrubber was being applied to treat fecal odors in an air stream. Compounds responsible for such odors are generally readily soluble in water and easily react with oxidizing agents such as sodium hypochlorite. Gas chromatographic techniques were used to identify and determine the concentration of gaseous contaminants in both the inlet to and the exhaust from the scrubber. Analyses of gases entering the scrubber showed that the gas stream contained a large variety of chemically generally non-reactive, volatile organic compounds in significant quantity. Surprisingly, there was a significant decrease in the concentration of many of those volatile organic compounds in samples of air taken from the scrubber exhaust. Exemplary results obtained are set out in the following Table.

TABLE 1

| Compound | Concentration, parts per billion | |
|---|---|---|
| | Inlet | Outlet |
| Pyridine | 36 | 7 |
| Terpene | 603 | 0 |
| Limonene | 779 | 31 |
| Xylene | 24 | 8 |
| Decahydronaphthalene | 201 | 57 |
| Trimethylbenzene | 72 | 19 |
| Tetrachloroethylene | 14 | 7 |
| Dichlorobenzene | 66 | 22 |
| Carbon disulfide | 18 | 13 |
| Dimethyl sulfide | 225 | 3 |
| Acetone | 2469 | 770 |
| Methylethylketone | 3753 | 588 |
| Hexanone | 62 | 19 |
| Ethanol | 13 | 0 |
| Methylpropylbenzene | 13 | 9 |
| Styrene | 76 | 0 |
| Butylbenzene | 39 | 20 |
| Isobutyltoluene | 24 | 11 |
| Alkylbenzene, mol. wt. 134 | 72 | 34 |
| Naphthalene | 32 | 9 |
| Methylnaphthalene | 45 | 20 |
| Pentane | 28 | 6 |
| Isoprene | 179 | 0 |
| Tetramethylhexane | 96 | 49 |
| Decane | 2668 | 182 |

As can be appreciated from a review of these data, a wide variety of chemical compounds were substantially reduced in concentration by passage through the scrubber.

Having now concentrated contaminant gases in the small aqueous droplets, it is next necessary to remove these droplets from the gas stream. This may be accomplished by a variety of mechanisms. Probably first in importance is the setting of an appropriate contact time between the gas and the liquid droplets. There must be provided an adequate time for contact between gas and droplets for accomplishing the gas cleaning; the transfer of contaminant molecules from the gas to the liquid droplets. Thereafter, additional contact time encourages the collision between droplets which merge, become larger, and fall from the gas stream. Additional turbulence, after gas cleaning is complete, also encourages droplet collisions and enlargement. Provision of abrupt turns in gas direction or the interjection of targets for collision such as with a mist eliminator aids droplet removal. Centrifugation, which can occur as air passes through a fan, tends to throw liquid droplets to outer walls. Collision with larger droplets that may be introduced as a spray also serves to strip the smaller droplets from the air stream but this technique has the disadvantage of increasing liquid effluent and decreasing contaminant concentration in the effluent. Cooling of the gas after transfer of organic compounds to the droplets has been accomplished causes droplet growth through condensation of water vapor from the saturated gas. Cooling of the saturated gas may be carried out by the introduction of cold air but is preferably accomplished by use of chilled surfaces placed in contact with the gas stream. Finally, design of the exhaust stack to have a low gas velocity will ensure that droplets which may have been increased in size through prior collisions will not be transported out of the stack.

Figure 1:
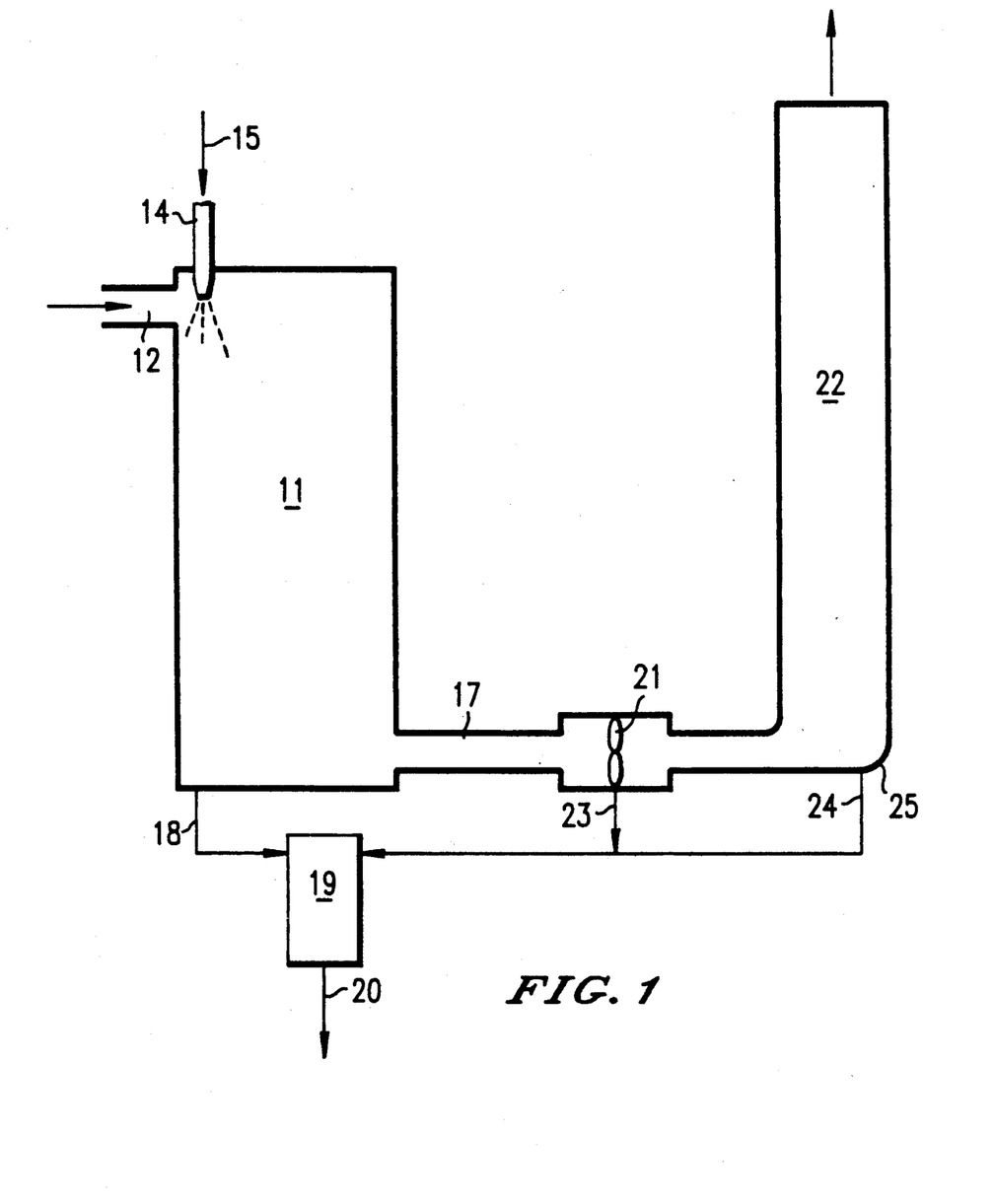

The process of this invention can be more readily appreciated by reference first to FIG. 1 which depicts in generally schematic form one preferred embodiment of the invention. Referring now to that Figure, an air stream containing small quantities of volatile organic compounds is passed to reaction chamber 11 by way of conduit means 12. Water or dilute chemical solution is supplied to a nozzle or other atomizing means 14, located to achieve a dispersion of droplets into the incoming air stream, by way of conduit 15 where it is atomized into tiny droplets. The volume of reaction chamber 11 is sized relative to the flow rate of the air stream entering the chamber through conduit 12 so as to provide a contact time between liquid droplets produced by the nozzle 14 and the air being treated of at least a few seconds, preferably in excess of three seconds, and to provide, in addition, time for droplet growth through collision between droplets and other mechanisms. The combined residence time for transfer of organic compounds to the droplets and for droplet growth to occur within the reaction chamber will vary according to conditions and may be in excess of 60 seconds. The droplets produced by nozzle 14 must be sized such that a substantial portion of the droplet population has an internal pressure significantly above atmospheric. In terms of droplet diameter, this requires that the droplets be mostly less than 20 microns in diameter and preferably less than 10 microns in diameter.

The treated air stream, depleted in many of the volatile organic compounds carried therein, exits chamber 11 by way of duct 17 which is positioned at the chamber end opposite the gas entry. Drain means 18 are provided at the bottom of the chamber to remove settled out spray liquid from the chamber.

The settled out spray liquid removed from the reaction chamber by way of line 18 is enriched in those compounds stripped from the air stream or their products of reaction. That liquid may be disposed of in a variety of appropriate ways so long as disposal is accomplished with limited release of the contained contaminant compounds. In the embodiment illustrated, the effluent is further treated with activated carbon or other adsorbent in column 19 to strip the organics and leave a relatively pure aqueous stream 20. The basic point is that the contaminant organic compounds originally contained in a large volume of air have been concentrated in a quite small volume of liquid making conventional disposal or a wide variety of removal techniques far more practical.

The gas in duct 17 passes through an exhaust fan 21 which propels the gas and also causes collisions between droplets and centrifuges droplets from the gas stream. These liquids are removed through drain 23 and combined with drain 18 for disposal.

The exiting gas then passes through ducting to an exhaust gas stack 22 which desirably has a larger diameter than ordinarily would be provided with resultant low gas velocity so that droplets will not be transported up the stack. Those droplets which collide at the elbow 25 or the stack 22, or fall out within the stack, are collected by drain 24 and merged with drains 18 and 23 for disposal.

Figure 2:
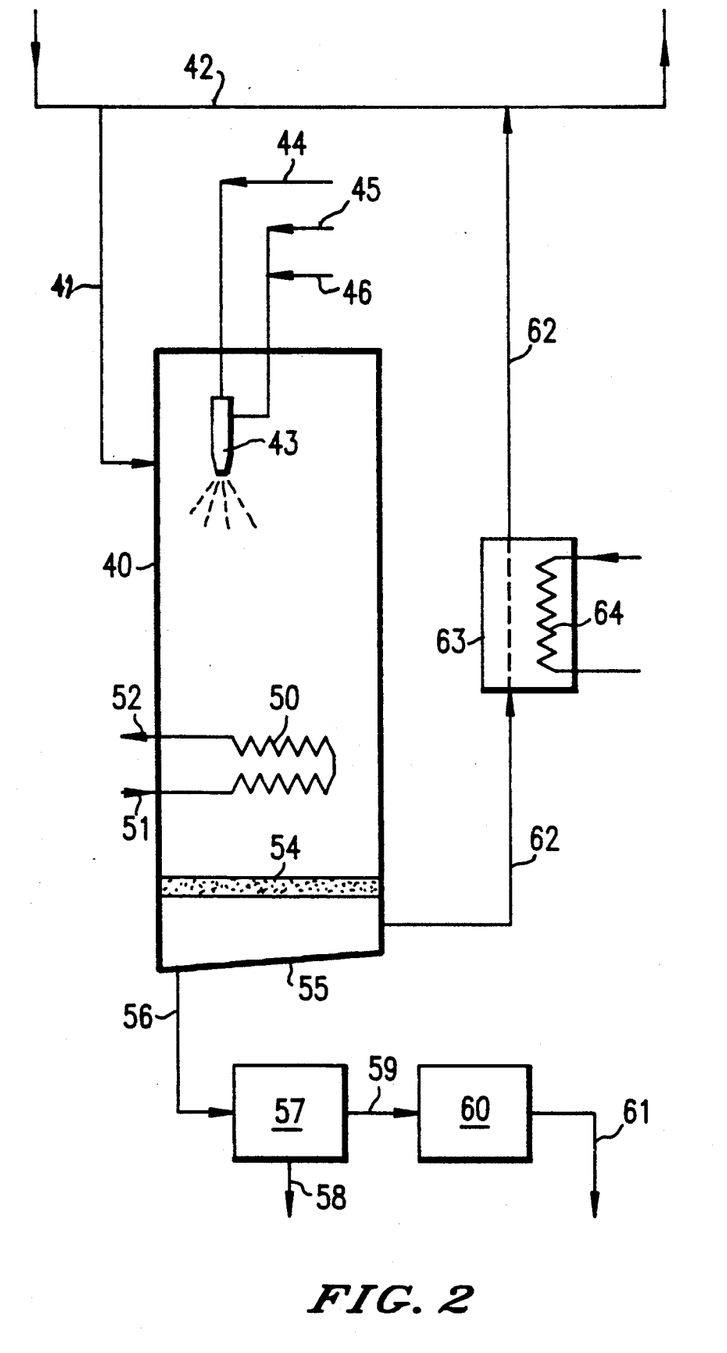

Turning now to that embodiment of the invention illustrated in FIG. 2, there is shown a system adapted for cleaning and recirculating air within a confined space such as an office building. There is provided a reaction chamber 40 through which is passed a stream 41 of air to be treated. Air stream 41 may be, for example, a side stream taken from recirculating air stream 42 and returned thereto after cleaning. A nozzle 43, capable of producing a very finely divided spray of aqueous droplets, is located within the chamber near the point of gas entry. Depending upon the air flow rate and upon the nozzle capacity, either a single nozzle or a plurality of nozzles may be employed. In any event, the nozzle or nozzles used must be capable of producing a sufficient quantity of a fine droplet spray having a number median droplet diameter of less than about 10 microns to saturate the air being treated and to provide a residual droplet volume of at least about 5 ml per cubic meter of air. Nozzles suitable for use in this process will ordinarily be powered by a stream of compressed gas 44, suitably air, at a pressure ranging from about 2 to 10 kg/sq.cm. Water is supplied to the nozzle by way of line 45 and, in one preferred embodiment, a small amount of a water soluble chemical or chemicals is supplied through line 46 for mixing with the water ahead of the nozzle.

Reaction chamber 40 is sized according to the flow rate of the air being treated so that there is an adequate reaction time, generally in excess of 3 seconds, for the volatile organic compounds contained in the gas to be captured by and contained in the aqueous droplets. Additional chamber volume must be provided to allow for droplet growth and coalescence and separation of the droplets from the air stream. Such additional chamber volume may be provided within the same vessel as is used for reaction of the volatile organic compounds with aqueous droplets, as is shown in the Figure, or the growth, coalescence and removal functions may be carried out in a second chamber in series with and downstream of the first. In either arrangement, it is preferred to provide means within the chamber to aid and promote droplet growth and coalescence.

Such droplet growth and coalescence means may appropriately include heat exchange surfaces 50 having an entry 51 and an exit 52 for the circulation of a chilled fluid therethrough. As the water saturated, droplet carrying air stream contacts the cold heat exchange surfaces 50, condensation occurs causing droplet growth. There also occurs a collection and coalescence of water droplets on the heat exchange surfaces. That mode of collection is enhanced by thermophoresis effects which result from the removal of heat from a gas stream. When heat is removed from gas stream by indirect contact heat exchange, there is developed a temperature gradient between the heat exchange surfaces and water droplets carried in the gas stream. That temperature gradient causes droplets to be driven toward the colder heat exchange surfaces by differential molecular bombardment. Upon contact with the wet heat exchange surface, individual droplets merge and coalesce to form a film which drips from the exchanger surfaces. Other droplet coalescence means such as demister 54 may be used either alone or in combination with heat exchange means. Demister 54 may appropriately comprise multi-layers of fabric mesh or similar types of high surface area, low pressure drop impaction means.

The bottom of reaction chamber 40 is arranged to drain the liquid effluent produced by droplet coalescence and separation from the interior of the chamber for further treatment. That may be accomplished by providing a sloping floor 55 on the chamber bottom as shown or the bottom may be shaped as a shallow cone or in such a manner as to provide rapid drainage. A drain line 56 leads from the low point of the chamber bottom to a first treatment means 57 which may comprise a filter of appropriate type to remove solid materials 58 from the chamber effluent. The filtered liquid is then passed by way of line 59 to treatment means 60 where the volatile organic compounds and other contaminants are stripped from the water stream to produce a waste water stream 61 fit for routine disposal. Treatment means 60 may utilize any of those effluent treatment techniques, such as adsorption, distillation and the like, which were previously described so long as the contaminant compounds are safely contained within means 60 or destroyed by the treatment employed in means 60.

A cleaned gas stream 62, depleted of liquid droplets, is removed from the bottom of chamber 40 and is eventually merged with circulating air stream 42. The temperature of clean gas stream 62 may be adjusted by passing it through heat exchanger 63 before its merger with circulating stream 42. Heat exchanger 62 may conveniently be of the indirect contact type in which a heated fluid is passed through heat exchange coils 64. That temperature adjustment ordinarily is seasonal; the cooled air stream 62 aiding in the air conditioning of a building in the summer months. Gas stream 62 is saturated with water vapor as it leaves chamber 40. Depending upon the season of the year and the condition of circulating stream 42 it may be desirable to lower the relative humidity of stream 62 by removing at least some of the water vapor carried therein. Dehumidification may be accomplished by passing gas stream 62 through a disiccant bed (not shown) as is known in the art.

Chamber 40 has been described and illustrated as being a vertically extending tank utilizing downward flow of the air being treated. That geometry is generally convenient and works well but is not necessary to the functioning of the process. Because the settling velocity of the tiny aqueous droplets used in the process is so low, it is quite possible to utilize horizontal flow arrangements and to even use an upflowing cocurrent arrangement in the gas-liquid contacting step.

In those uses of the process wherein the air within an occupied building, such as a typical office building, is being treated, it is ordinarily advantageous to add small amounts of certain chemical agents through line 46 for incorporation within the droplets. In this regard, it is necessary that the chemical be essentially harmless to humans but also be effective to react with and destroy odors and to kill air borne bacteria and other microorganisms. Preferred chemicals include sodium hypochlorite, or other source of the hypochlorite ion, and hydrogen peroxide. Many of the common odors associated with human habitation react readily with oxidizing agents such as hypochlorites and peroxides. Both chemicals are harmless to humans at low concentrations. Hypochlorite in particular is an extremely effective bactericide but hydrogen peroxide has the considerable advantage of being completely odorless and having only water as a byproduct of reaction after oxidation. Any noticeable carryover of the hypochlorite can usually be avoided by careful adjustment of the amount added to the water fed to the nozzle. In some instances it may be appropriate to add a subsequent treatment to ensure complete removal of the added chemical agents. A water wash, for example, is effective to remove lingering traces of hypochlorite. Residual hypochlorite can also be removed by reaction with appropriate chemicals as for example sodium thiosulfate.

It is important to the proper functioning and optimization of the process, whether used for cleaning recirculating air in a human habitation or for the cleaning of industrial gas streams, that attention be directed to a number of different factors. Some of the volatile organic compounds present in gas streams amenable to treatment by this process may be relatively reactive compounds. Consequently, it is often advantageous to add an appropriate chemical to the water used for droplet production in order to obtain reaction with gaseous contaminants which might not otherwise be removed by the process. As noted earlier, oxidizing agents such as sodium hypochlorite and hydrogen peroxide have been found especially useful in the cleaning of gas streams likely to be breathed by humans. A much broader choice of appropriate chemicals including sodium hydroxide, sulfuric acid and other strong acids and bases, oxidizing agents, and reducing agents is appropriate for use in the cleaning of gas streams from commercial and industrial processes. Treated gas streams from commercial and industrial processes are usually highly diluted with ambient air before humans are exposed so a greater variety of chemicals may suitably be considered for cleaning such gases. All of those types of chemicals may find use in the removal of volatile organic compounds from many industrial gas streams such as, for example, the waste gas from sewage sludge composting operations. Volatile organic compounds absorbed by the sludge are released during the composting process. Some of the reactive volatile organic compounds released can be oxidized to obtain innocuous products of reaction using sodium hypochlorite or hydrogen peroxide while others require different types of chemicals, especially acids and bases, for removal from the gas stream.

Close attention must be paid to the amount and concentration of chemicals added to the water supplied to the atomizing nozzle. Chemical addition beyond that required for reaction with target contaminants is not desirable and that requirement demands good sensing and control mechanisms for the control of chemical feed.

The size and size distribution of the atomized droplets has a direct effect upon the operating efficiency of the process. Any type of atomization system can be used which creates a peaked distribution with a number majority, or number median, of the droplets having an internal pressure above about 3 to 4 psi. That pressure corresponds to a size distribution wherein the majority of the count of droplets have a diameter below about 10 microns. Because it is the small, high internal pressure droplets which are most effective to remove contaminants, it is advantageous to use atomizing means which produce a high proportion of tiny droplets with as small a population of larger lower internal pressure, fast-falling droplets as possible.

Volume of liquid atomized must be proportioned to contaminant concentration and gas flow rate. It is first necessary to ensure that adequate liquid is atomized to saturate the gas stream if it is at less than 100% relative humidity. After saturation of the gas stream, adequate numbers of high internal pressure droplets must remain to react with and absorb or dissolve the contaminant compounds. Lastly, it is advantageous to avoid a large excess of liquid as that increases the amount of liquid effluent requiring disposal. For most applications, adequate contaminant removal is obtained by introducing liquid feed at a rate to obtain a residual volume of small droplets, after evaporation, of about 50 ml per cubic meter of air.

Reaction chamber design also affects process efficiency. The design of the reaction chamber must provide for adequate contact time between the droplets and the gas to achieve effective gaseous contaminant removal. It must also provide for additional contact time for droplet collision, growth, coalescence and separation from the gas stream.

Finally, the design of the gas exhaust system, including impingement means, fan, ducting and exhaust stack should be such as to maximize droplet collection and removal.

While specific embodiments of the invention have been described, other variations will be obvious to those skilled in the art and such variations are within the scope of the disclosed and claimed invention.

I claim:

1. A method for removing volatile organic compounds which are normally non-soluble in water and other contaminants from a gas stream wherein the improvement comprises:

contacting the gas stream with tiny, aqueous spray droplets for a time sufficient to achieve substantial transfer of said volatile organic compounds from the gas into the droplets, said droplets displaying an internal pressure substantially greater than atmospheric;

causing said droplets, now containing volatile organic compounds, to grow and to coalesce;

removing said coalesced droplets from the gas stream to obtain an aqueous liquid effluent having volatile organic compounds contained therein; and treating said aqueous liquid effluent so that the captured volatile organic compounds contained in the effluent are not released to the environment.

2. The method of claim 1 wherein the time provided for contact between said gas stream and spray droplets is greater than 3 seconds and wherein the population of aqueous spray droplets has a number median diameter less than 10 microns.

3. The method of claim 1 wherein the volume of spray droplets introduced into the gas stream is sufficient to obtain a liquid effluent volume in excess of 5 ml per cubic meter of gas treated.

4. The method of claim 1 wherein said step of treating the aqueous liquid effluent comprises incineration.

5. The method of claim 1 wherein the volatile organic compounds and other contaminants contained in said gas stream include compounds which are chemically reactive in dilute water solution and wherein a chemical selected from the group consisting of oxidizing agents, acids and bases is added to the water which is atomized to produce said droplets, said chemical addition being in an amount sufficient to provide the stoichiometric requirements for complete reaction with said reactive compounds.

6. The method of claim 1 wherein said gas stream is an industrial gas stream, wherein the population of aqueous spray droplets has a number median diameter less than 10 microns, wherein the time provided for contact between the gas stream and spray droplets is greater than 3 seconds, and wherein the volume of spray droplets introduced into the gas stream is sufficient to obtain a liquid effluent volume in excess of 5 ml per cubic meter of gas treated.

7. The method of claim 1 wherein said step of treating the aqueous liquid effluent comprises a physical treatment thereof.

8. The method of claim 7 wherein said physical treatment is distillation.

9. The method of claim 7 wherein said physical treatment is crystallization.

10. The method of claim 7 wherein said physical treatment is froth flotation.

11. The method of claim 7 wherein said physical treatment is solvent extraction.

12. The method of claim 1 wherein said volatile organic compound-containing droplets are caused to grow and to coalesce by cooling said gas whereby water vapor contained in the gas condenses on said droplets.

13. The method of claim 12 wherein said gas stream is an industrial gas stream, wherein the population of aqueous spray droplets has a number median diameter less than 10 microns, wherein the time provided for contact between the gas stream and spray droplets is greater than 3 seconds, and wherein the volume of spray droplets introduced into the gas stream is sufficient to obtain a liquid effluent volume in excess of 5 ml per cubic meter of gas treated.

14. The method of claim 12 wherein said gas stream is a circulating air stream within an inhabited enclosure and wherein the treated air stream is returned to the enclosure.

15. The method of claim 14 wherein a small amount of a chemical agent is added to the water which is atomized to produce said droplets, said chemical agent being harmless to humans in low concentration but being effective to kill air borne bacteria in said air stream.

16. The method of claim 15 wherein said chemical agent is selected from the group consisting of sodium hypochlorite and hydrogen peroxide and wherein the volume of spray droplets introduced into the air stream is sufficient to obtain a liquid effluent volume in excess of 5 ml per cubic meter of air treated.

17. The method of claim 1 wherein said gas stream is a circulating air stream within an inhabited enclosure and wherein the treated air stream is returned to the enclosure.

18. The method of claim 17 wherein a small amount of a chemical agent is added to the water which is atomized to produce said droplets, said chemical agent being harmless to humans in low concentration but being effective to kill air borne bacteria in said air stream.

19. The method of claim 18 wherein said chemical agent is selected from the group consisting of sodium hypochlorite and hydrogen peroxide and wherein the volume of spray droplets introduced into the air stream is sufficient to obtain a liquid effluent volume in excess of 5 ml per cubic meter of air treated.

20. A method for cleaning and recirculating air within a confined space adapted for human habitation to remove volatile organic compounds which are normally non-soluble in water and other contaminants therefrom comprising:

taking a stream of air from said confined space and passing said air stream through a reaction chamber;

contacting the air within said chamber with tiny, aqueous spray droplets for a time sufficient to achieve substantial transfer of said volatile organic compounds from the air into the droplets;

causing said volatile organic compound-containing droplets to grow and to coalesce by cooling said air thereby condensing water vapor contained in the air on said droplets;

separating said coalesced droplets from the air to obtain a cleaned air stream and an aqueous liquid effluent having volatile organic compounds contained therein;

returning said cleaned air stream to said confined space; and treating said aqueous effluent so that the captured volatile organic compounds contained in the effluent are not released to the environment.

21. The method of claim 20 wherein said aqueous spray droplets have a number median diameter of less than 10 microns and wherein the time provided for contact between the gas stream and spray droplets is greater than 3 seconds.

22. The method of claim 20 wherein a small amount of a chemical agent is added to the water from which said spray droplets are formed, said chemical agent being harmless to humans in low concentration but being effective to kill air borne bacteria in said gas stream.

23. The method of claim 22 wherein said chemical agent is selected from the group consisting of sodium hypochlorite and hydrogen peroxide and wherein the volume of spray droplets introduced into the air stream is sufficient to obtain a liquid effluent volume in excess of 5 ml per cubic meter of air treated.

* * * * *